United States Patent [19]

Vanderwal, Jr.

[11] 4,226,400
[45] Oct. 7, 1980

[54] GUIDE MEANS FOR HONING AND LIKE MACHINES

[75] Inventor: Frank E. Vanderwal, Jr., St. Louis County, Mo.

[73] Assignee: Sunnen Products Company, St. Louis, Mo.

[21] Appl. No.: 969,675

[22] Filed: Dec. 15, 1978

[51] Int. Cl.³ .......................... F16M 1/00; F16M 3/00
[52] U.S. Cl. ................................ 248/646; 51/166 TS; 308/3 A
[58] Field of Search ..................... 51/166 R, 166 TS; 248/646; 308/3 A, 3 R

[56] References Cited

U.S. PATENT DOCUMENTS

| | | | |
|---|---|---|---|
| 1,410,725 | 3/1922 | Schank | 248/646 |
| 1,475,453 | 11/1923 | Shinn | 308/3 R |
| 1,485,016 | 2/1924 | Cardullo et al. | 308/3 A |
| 2,398,250 | 4/1946 | Robbins | 51/166 TS |
| 3,088,248 | 5/1963 | Strzoda | 51/166 R X |
| 3,537,762 | 11/1970 | Lodige | 308/3 R |
| 3,619,013 | 11/1971 | Jones | 308/3 A X |
| 3,634,975 | 1/1972 | Hensley | 51/166 TS X |

FOREIGN PATENT DOCUMENTS 436631  10/1935  United Kingdom .................... 308/3 A Primary Examiner—J. Franklin Foss
Attorney, Agent, or Firm—Charles B. Haverstock

[57] ABSTRACT

Improved guide means for supporting a rotatable member or mandrel during reciprocating motion thereof including a machine feed portion having a pair of guide rails spaced apart on a fixed support structure, a plurality of longitudinally spaced support members for supporting each of the guide rails at spaced locations therealong, each of which has an upwardly facing rail engaging surface defined by angularly related surface portions, a carriage structure having spaced rail engaging support members mounted for movement on the respective rails, and apparatus associated with the rail support members including mechanism adjustable to precisely align the support members with the respective rails.

10 Claims, 6 Drawing Figures

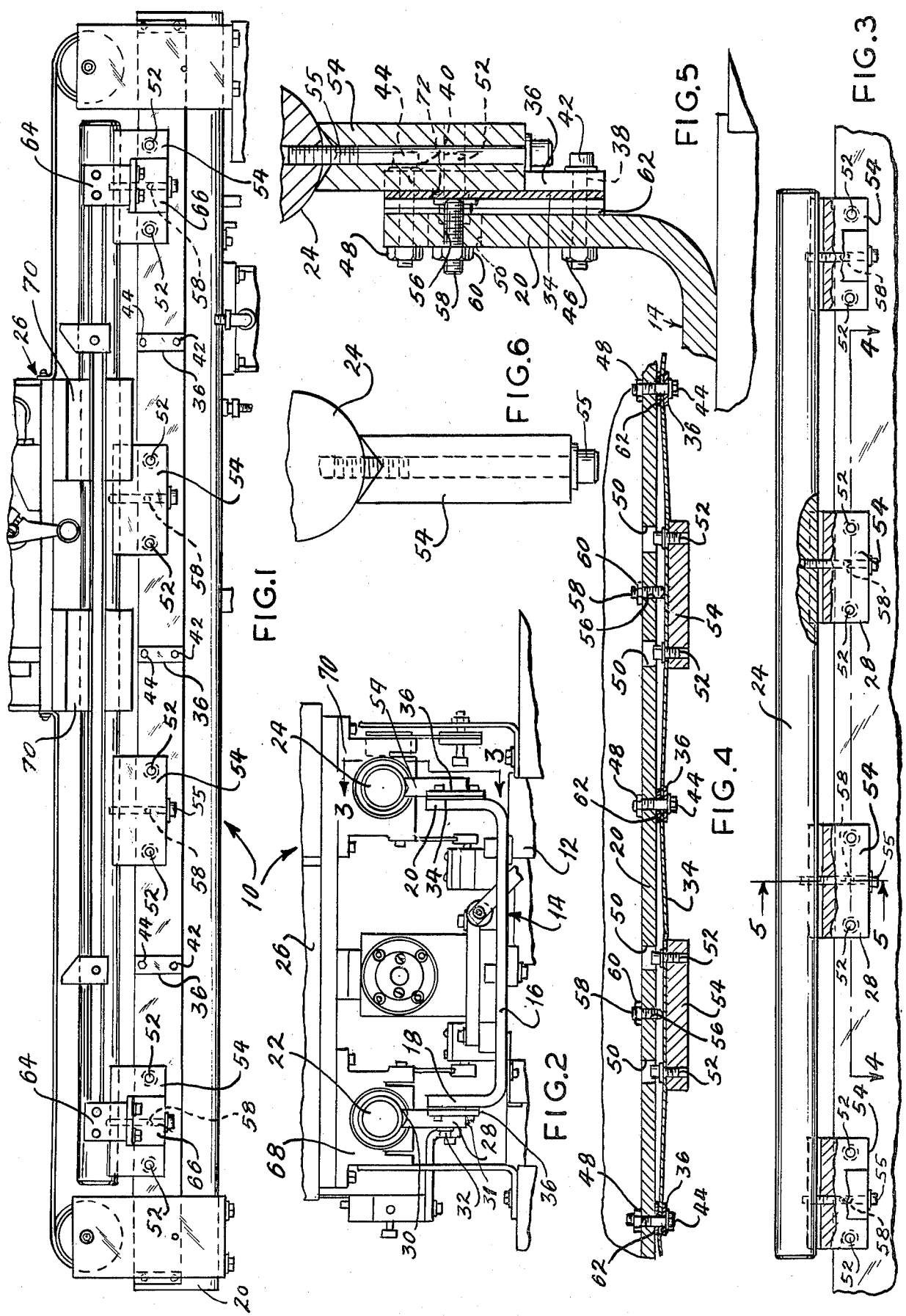

GUIDE MEANS FOR HONING AND LIKE MACHINES

Honing and other machine operations often require work engaging portions which are reciprocated and rotated while engaged with a work surface. In the past the reciprocating means employed have often included means which reciprocated the work engaging member, or the workpiece, but in the past little or no attention has been given to perfecting the accuracy of the reciprocating motion, and in the usual situation commercially available journal or guide means have been used to move the crank or other reciprocating members. With conventional work engaging members, where the work engaging member is reciprocated numerous times during any one operation on a work piece, it has not been particularly important to maintain the accuracy of movement of the reciprocating means in order to maintain adequate alignment of the work member with the work piece surface. However, as more accuracy is required, and particularly with tools such as diamond coated honing mandrels which may only pass through the work piece once or perhaps several times at most, it becomes increasingly important to accurately control the reciprocating or longitudinal movements of the tool (or work) since there is no opportunity later to correct for errors. It has therefore been found necessary with such tools to provide more accurate means to maintain the working member at all times in proper alignment during movement thereof through the work piece. A honing mandrel of the type for which the subject improvement is especially useful is disclosed in co-pending U.S. patent application Ser. No. 916,518 which is assigned to applicant's assignee.

As attention has been given to the problem of more accurately controlling the longitudinal movement of a working member, attention has also been given to the means for supporting the carriage on which the work engaging member or tool is supported. One suggestion that has been tried with some success is to construct an elongated carriage of generally U-shaped cross section for supporting the work engaging member and to mount the carriage for movement on spaced rail members. In order to achieve the desired accuracy of movement, however, the rail members must be supported so as to be in precise parallel alignment along their lengths with little or no opportunity for bending or other movement as the carriage with the work engaging portions supported thereon moves therealong. The present invention teaches the construction of such means for more accurately positioning and supporting the spaced carriage supporting guide rails taking into account imperfections that may exist in the base structure on which the rails are supported and imperfections in the rails themselves.

It is therefore a principal object of the present invention to provide more accurate means for guiding a work engaging member such as a rotating honing mandrel during longitudinal movement thereof as through a work piece.

Another object is to provide means for honing more nearly perfectly cylindrical surfaces.

Another object is to provide improved support means for the guide rails along which a carriage structure moves.

Another object is to provide adjustable support means for a guide rail.

Another object is to improve the reciprocation movement of a working member.

Another object is to improve the operating accuracy of work engaging mandrels having surfaces formed by extremely hard wear resistent materials such as particles of diamond, cubic boron nitride, tungsten carbide and other like materials.

Another object is to teach the construction and operation of a honing machine which is extremely accurate yet relatively simple to use.

Another object is to reduce the time required to mass produce accurately honed surfaces.

Another object is to provide means to reduce the cost of building base structures for machine tools that have work engaging members supported thereon for reciprocating movement.

These and other objects and advantages of the present invention will become apparent after considering the following detailed specification which discloses a preferred embodiment of the present invention in conjunction with the accompanying drawing, wherein;

FIG. 1 is a fragmentary side elevational view showing a support structure for a longitudinally movable work engaging carriage structure such as a carriage structure for a honing machine;

FIG. 2 is a left end view of the structure shown in FIG. 1;

FIG. 3 is a fragmentary cross-sectional view taken on line 3—3 in FIG. 2;

FIG. 4 is an enlarged fragmentary cross-sectional view taken on line 4—4 of FIG. 3;

FIG. 5 is a fragmentary cross-sectional view taken on line 5—5 of the FIG. 3; and FIG. 6 is a fragmentary view showing one of the guide rails attached to a support member.

Referring to the drawings more particularly by reference numbers, number 10 refers generally to a machine such as a honing machine having features constructed according to the teachings of the present invention. The machine 10 has a base structure 12 which includes an elongated U-shaped support member 14 as clearly shown in FIG. 2. The U-shaped member 14 is shown as being of one piece construction having a central horizontal portion 16 and spaced connected upwardly extending flange portions 18 and 20. The present device is also applicable to other forms of supports including supports made of more than one member. The flanges 18 and 20 have attached to them means for supporting spaced guide rails 22 and 24 respectively. It is important to the present construction that the rails 22 and 24 be very accurately located and supported in spaced parallel relation on the structure so that members that are movably supported thereon, and which in turn support the work engaging members or honing mandrel (not shown), will be very accurately located and more relative to the work surface during operation thereof. Any misalignment, unevenness or inadequate support for the rail members 22 and 24 will cause some error in the movement of the carriage and the work engaging portions supported thereon as they move in the work, and this will in turn cause some error in the surface being operated on, all of which is undesirable.

The means which locate and support the elongated rails 22 and 24 include a plurality of spaced support members which will be described later and which are attached to each of the respective upwardly extending flanges 18 and 20 on the U-shaped channel member 14. It is anticipated that the U-shaped member 14 will be constructed to be dimensionally fairly accurate, but it is also expected that the U-shaped member 14, partly because of its size which makes it difficult to construct to the desired accuracy, will have some dimensional errors in it, albeit hopefully relatively slight. However, even slight errors, if not compensated for, will cause some misalignment due to unequal support for one or both of the guide rails 22 and 24, and if this occurs, it will cause some imperfections in the surfaces being honed or otherwise worked on. Misalignment errors can also cause binding and jerky movements of the movable carriage assembly on the guide rails, all of which is undesirable and produces error. In the construction of the U-shaped member, the flange member along one side thereof, such as the flange 18, can usually be formed to an initial accuracy which enables the spaced support means for the associated guide rail 22 to be sufficiently in alignment without the need for further adjustment. The support means for the rail 24 along the opposite side of the U-shaped member 14 on the flange 20, however, will usually have some dimensional and other alignment errors, and it is important to be able to compensate for these in order to provide accurate alignment and support for the guide rail 24. The means attached to the flange 20 that enables this adjustment to be made are important to the present invention.

Referring to FIG. 2 it can be seen that attached to the flange 18 at spaced locations therealong are a plurality of similar rail supporting block members 28 which extend upwardly therefrom and which are shown having V-shaped grooves 30 formed in the upper surfaces thereof. The V-shaped grooves 30 are relatively shallow and the block members 28 engage and support the lower surface of the rail 22 at spaced locations therealong. Threaded members 31 extend upwardly through bores in the members 28 and into threaded bores in the rail 22. If the flange 18 is straight and accurate along its length, and if the spaced support members 28 are accurately formed and attached to the flange 18 as by means such as threaded members or bolts 32, then the rail 22 will be uniformly supported along its length, a condition to be desired. If the flange 18 is not straight, some shimming may be necessary between the blocks 28 and the flange 18 to assure that the rail 22 is supported and maintained straight. However, even if the flange 18 is formed relatively accurately it is anticipated that there will be some variation in the spacing and parallel alignment of the flanges 18 and 20, and even small misalignments or inaccuracies that may exist should be compensated for if the tool is to achieve the desired honing accuracy. The means for positioning and supporting the rail 24 are therefore very important to the present invention.

FIGS. 4 and 5, show the provision of adjustment means mounted on the flange 20 for locating and supporting the rail 24. The means include an elongated plate member also referred to as wall member 34 which is attached to the flange 20 at spaced locations therealong by similar means which include vertically oriented double opening washer members 36 which receive bolts 42 and 44 respectively therethrough. The bolts 42 and 44 extend through openings in the washers 36 and through aligned openings through the wall member 34, and through the flange 20. The bolts 42 and 44 are threaded into threaded bores in the flange 20 and are secured by means of nuts 46 and 48 respectively.

At intermediate locations along the flange 20 in the spaces between the bolt locations described, are located other openings 50 through the flange 20. The openings 50 provide access means to other bolts 52 which are used for attaching the wall member 34 to spaced upwardly extending rail support members 54 which are similar in shape to the rail support members 28. Two bolts such as the bolts 52 are used to attach each of the members 54 to the elongated wall member 34. Note that the members 28 are attached directly to the flange 18 while the members 54 are attached to the wall member 34 which is attached to the flange 20. The members 54 are in turn connected to the rail 24 by threaded members 55 which extend upwardly through bores in the members 54 and into threaded bores in the rail 24. Keep in mind that either or both the flange 20 and the rail 24 may be somewhat non-straight and non-parallel to the rail 22. The present means are devised to correct for both of these possibilities since accurate alignment and parallelism are important for best machine operation. In the spaces between each pair of the bolts 52 which attach each of the respective rail support members 54 to the wall member 34 is provided a threaded bore 56 in the flange 20 which receives a threaded adjustment member 58. The free end of each of the threaded members 58 may have a wrench socket or screwdriver slot which is accessible to adjust same, and each of the members 58 also has a lock nut 60 threadedly positioned thereon and used to lock it in a position of adjustment of the member 58.

The flange 20 and the wall member 34 are both formed of relatively heavy gauge metal but the flange 20 is significantly heavier than the wall member 34 so that the wall member 34 will deform with minimum distortion of the flange 20, and adjustment of the rail support members 54 is shown substantially exaggerated in order to more clearly illustrate the invention. In the usual situation, because of the size of the U-shaped member 14, it is not possible to make the flanges 18 and 20 precisely accurate and in alignment as aforesaid. Yet it is also important to provide accurate alignment and support for the shafts 22 and 24. Because of this, it has been discovered that it also usually necessary to provide shims 62 between at least some of the elongated washers 36 and the flange 20. In this way any errors in machining or otherwise forming the flanges 18 and 20 can be compensated for at the factory by the shims 62. The use of the shims 62 also substantially increases the range of possible adjustment of the rail support means and substantially reduces the manufacturing costs and tolerances required for the U-shaped channel member 14. In a typical construction the member 14 and the rails 22 and 24 may be three feet or more in length, and when constructing parts of such size it is not economically practical to eliminate all slight errors in straightness and parallelism of the flanges 18 and 20. Hence the use of shims 62 and the provision of the other adjustment means described herein, substantially reduces the cost of the construction without sacrificing anything in accuracy.

Referring again to FIG. 1, there are shown positions for four of the rail support members 28 (and 54) along the length of the rails 22 and 24. Other members 64 and 66 are mounted on the subject structure and are used as part of the means that control and limit movement of the carriage assembly 26. These members however, are not part of the present invention as such. With the construction as shown, the overhead carriage means generally described by the number 26, can be mounted on the rails 22 and 24 and supported for very accurate movement therealong by suitable rail engaging means or slide members illustrated generally by numbers 68 and 70. Except for the accurate support means provided for the rails 22 and 24, the construction and operation of the honing machine itself are not part of the present invention.

FIG. 6 shows the connection between one of the support members 54 and the rail 24. The vertical position of the members 54 can be adjusted somewhat by means of elongated openings 72 formed in the wall member 34 (FIG. 5), but the lateral adjustment thereof is accomplished by means including the adjustment members 58 and the use of the shims 62. These means are provided to accurately locate the wall member 34, the shaft support members 54 and the rail 24 which is attached thereto as clearly shown in FIGS. 4 and 5. In this way any errors in alignment of the flanges 18 and 20 and of the rails 22 and 24 can be corrected.

The present means are also for adjusting the position of one rail member relative to another in order to compensate for even slight errors in parallel alignment and as such has wide application and makes it possible to improve the operating relationship between almost any movable carriage structure and the rails that support it during movement. Being able to accomplish this accurately and inexpensively represents an important step in the improved performance of many devices, expecially devices that have base structures that support rail members. It should also to be recognized that the principles and structure of the present invention have application to devices that may have more than two parallel rails, and it is possible using the present means to make additional corrections in the alignment of the rail support means from time to time to compensate for wear of parts and dimensional changes due to temperature and the other environmental and operational conditions that may have an affect. Depending on the size and length of the rails to be supported and their physical characteristics, including their weight and the number of rail engaging members on the carriage, will also determine the number, size and spacing of the rail support members, such as the numbers 28 and 54. The number and thickness of the shims 62 that are required for a particular application will also depend on the accuracy of the base structure on which the subject means are used.

Thus there has been shown and described novel means for accurately aligning, and supporting two or more spaced parallel rail members used for movably supporting a longitudinally movable assembly and to minimize binding and other desirable conditions thereof. As explained, this is very important to prevent even slight inaccuracies in the operation of a work engaging member such as a honing mandrel or other machine tool member. The present means fulfill all of the objects and advantages sought therefor. It will be apparent to those skilled in the art, however, after considering this specification and the drawings that many changes, modifications, alterations, and other uses and applications which do not depart from the spirit and scope of the invention are deemed to be covered by the invention which is limited only by the claims which follow.

What is claimed is:

1. Means for accurately locating and supporting two rail members in spaced parallel relationship comprising a base structure having spaced substantially parallel first and second upwardly extending wall portions, means mounted on said first wall portion including a plurality of spaced rail support members each having an upwardly facing surface formed thereon for engaging an associated one of the spaced rail members to be supported thereby, means mounted on the second upwardly extending wall portion for engaging and supporting the other of said rail members in spaced parallel relation to the aforesaid rail member, said means including an elongated wall member and means fixedly attaching said elongated wall member to said second upwardly extending wall portion to extend substantially along the length thereof, shim means positioned between said elongated wall member and said second upwardly extending wall portion at selected locations therealong to compensate for imperfections in the alignment thereof, a plurality of rail support members attached to said elongated wall member at spaced locations therealong, each of said rail support members having a rail engaging upper surface formed thereon, and spaced threaded adjustment members located along said second wall portion and adjustable therein to predeterminably space the elongated wall member and the rail engaging members thereon transversely relative to the second wall portion.

2. The means defined in claim 1 wherein the base structure includes an elongated U-shaped channel member formed by the spaced substantially parallel first and second upwardly extending wall portions and a wall portion extending therebetween.

3. The means defined in claim 1 wherein the rail members are elongated members having cylindrical outer surfaces, means for attaching each of the rail members to a respective one of the upwardly extending wall portions, said plurality of spaced rail support members including block members having their rail engaging surfaces formed by angularly related surface portions formed on the upper surfaces thereof.

4. The means defined in claim 1 wherein a carriage assembly is mounted for movement along the rail members, said carriage assembly having spaced rail engaging members mounted thereon.

5. The means defined in claim 1 wherein the spaced threaded adjustment members are located along said second wall portion at intermediate locations between the spaced means fixedly attaching the elongated wall member to the second wall portion, and means to lock the threaded members in predetermined positions of adjustment.

6. Means to support a pair of spaced elongated rails in parallel relation to each other comprising a base support structure having a pair of spaced and connected rail support portions, means to attach each of said rails to a respective one of the support portions so that the rails extend therealong, a plurality of spaced rail support members attached to each of said rail support portions to engage and provide backup support therefor, each of said rail support members having an elongated rail engaging surface formed thereon, means on one of said rail support portions to adjustably position the rail support members attached thereto to maintain the spaced rails in parallel supported relation, said last named means including a separate elongated wall member which is relatively somewhat more bendable than the associated rail support portion, means for connecting the separate elongated wall member to said rail support portion at spaced locations therealong said means including shim means to compensate for imperfections in alignment including parallel alignment between the spaced wall portions, other means for connecting a plurality of said rail support members to the separate elongated wall member at locations therealong intermediate between the means connecting the separate elongated wall member to the associated wall portion, means threadedly engagable with the said associated wall portion at said intermediate locations, said threaded means being engagable with the separate elongated wall member and adjustably in said wall portion to laterally position the separate elongated wall member and the rail support members attached thereto relative to the associated wall portion and to the associated rail.

7. The means defined in claim 6 wherein the rails are elongaed cylindrical members, each of said pair of spaced and connected rail support portions including means for attaching the respective rail thereto adjacent opposite ends thereof.

8. The means defined in claim 6 wherein the other means connecting the separate elongated wall member to the rail support portion include a transversely extending member having spaced openings therethrough and registering openings through the separate elongated wall member and through the rail support portion and through any shims required thereat, and threaded fastener means extending through said registered openings including means to hold the members together.

9. The means defined in claim 6 including means engagable with each of said means threadedly engagable with said wall portion to lock said associated threaded means in a position of adjustment.

10. The means defined in claim 6 wherein each of said plurality of rail support members connected to said separate elongated wall member is connected thereto by at least two threaded fasteners.

* * * * *

UNITED STATES PATENT OFFICE
CERTIFICATE OF CORRECTION

Patent No. 4,226,400          Dated October 7, 1980

Inventor(s)      Frank E. Vanderwal, Jr.

It is certified that error appears in the above-identified patent and that said Letters Patent are hereby corrected as shown below:

Column 5, line 50 "desirable" should be

--undesirable--

Column 7, line 13 "elongaed" should be

--elongated--

*Signed and Sealed this*

*Twenty-third* Day of *December 1980*

[SEAL]

*Attest:*

SIDNEY A. DIAMOND

*Attesting Officer*     *Commissioner of Patents and Trademarks*